United States Patent
Knapek et al.

(10) Patent No.: US 10,148,501 B2
(45) Date of Patent: Dec. 4, 2018

(54) METHOD FOR TRX INSTALLATION IN BSC

(71) Applicant: Telefonaktiebolaget LM Ericsson (publ), Stockholm (SE)

(72) Inventors: Bartek Knapek, Krakow (PL); Örjan Sjelvgren, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/317,612

(22) PCT Filed: Jun. 27, 2014

(86) PCT No.: PCT/SE2014/050810
§ 371 (c)(1),
(2) Date: Dec. 9, 2016

(87) PCT Pub. No.: WO2015/199595
PCT Pub. Date: Dec. 30, 2015

(65) Prior Publication Data
US 2017/0126498 A1    May 4, 2017

(51) Int. Cl.
*H04L 12/24* (2006.01)
*H04W 88/08* (2009.01)

(52) U.S. Cl.
CPC ...... *H04L 41/0813* (2013.01); *H04L 41/0806* (2013.01); *H04L 41/22* (2013.01);
(Continued)

(58) Field of Classification Search
CPC ..... H04L 41/0813; H04L 41/22; H04W 88/08
See application file for complete search history.

(56) References Cited

U.S. PATENT DOCUMENTS 6,393,483 B1 * 5/2002 Latif ............... H04L 41/0668
370/230
2003/0162537 A1 * 8/2003 Hirsch ............... H04L 41/022
455/423
(Continued)

FOREIGN PATENT DOCUMENTS

EP   1 058 989 A2   12/2000
EP   2150026 A1     2/2010
(Continued)

OTHER PUBLICATIONS

European Communication with Supplementary European Search Report issued in Application No. 14895735.0 dated Jun. 16, 2017.
(Continued)

*Primary Examiner* — Joseph Dean, Jr.
(74) *Attorney, Agent, or Firm* — Rothwell, Figg, Ernst & Manbeck, P.C.

(57) ABSTRACT

A method in a Base Transceiver Station, BTS for configuring hardware, HW, equipment being added or removed to/from the BTS. The BTS receives (201) configuration data for the added or removed hardware equipment via a user interface, UI. The BTS then initializes (202) a HW configuration according to the received configuration data in an installation database, IDB, of the BTS. When the HW configuration is initialized, the BTS sends (203) information about the added or removed HW equipment to a Base Station Controller, BSC. Based on the received information the BSC creates an object model of the added and/or removed HW equipment in the BTS.

21 Claims, 4 Drawing Sheets

(52) U.S. Cl.
CPC ........ *H04L 41/083* (2013.01); *H04L 41/0826* (2013.01); *H04W 88/08* (2013.01)

(56) References Cited

U.S. PATENT DOCUMENTS

| | | | | |
|---|---|---|---|---|
| 2006/0223572 A1* | 10/2006 | Hedin | ................... | H04W 24/02 |
| | | | | 455/552.1 |
| 2008/0320118 A1* | 12/2008 | Uchida | ................. | G06F 9/5061 |
| | | | | 709/221 |
| 2012/0127873 A1 | 5/2012 | Li et al. | | |
| 2013/0176897 A1* | 7/2013 | Wang | ................... | H04W 12/06 |
| | | | | 370/254 |
| 2013/0203398 A1* | 8/2013 | Callard | ................. | H04W 88/08 |
| | | | | 455/418 |

FOREIGN PATENT DOCUMENTS

| | | |
|---|---|---|
| EP | 2 523 526 A1 | 11/2012 |
| WO | 9922541 A1 | 5/1999 |
| WO | 99/35800 A2 | 7/1999 |
| WO | 99/37035 A1 | 7/1999 |
| WO | 0145347 A2 | 6/2001 |
| WO | 03009612 A1 | 1/2003 |
| WO | 2011/074011 A1 | 6/2011 |

OTHER PUBLICATIONS

International Search Report and Written Opinion issued in International Application No. PCT/SE2014/050810, dated Mar. 13, 2015, 10 pages.

\* cited by examiner

METHOD FOR TRX INSTALLATION IN BSC

CROSS REFERENCE TO RELATED APPLICATION

This application is a 35 U.S.C. § 371 National Stage of International Application No. PCT/SE2014/050810, filed Jun. 27, 2014, designating the United States, the disclosure of which is incorporated by reference.

TECHNICAL FIELD

Embodiments herein relate to a Base Transceiver Station, a Base Station Controller and methods therein. In particular, it relates to a method for configuring hardware equipment being added or removed to/from the Base Transceiver Station.

BACKGROUND

Communication devices such as User Equipments (UEs) are enabled to communicate wirelessly in a cellular communications network or wireless communication system, sometimes also referred to as a cellular radio system or cellular networks. The communication may be performed e.g. between two UEs, between a UE and a regular telephone and/or between a UE and a server via a Radio Access Network (RAN) and possibly one or more core networks, comprised within the cellular communications network.

The cellular communications network covers a geographical area which is divided into cell areas, wherein each cell area being served by an Base Transceiver Station (BTS). A cell is the geographical area where radio coverage is provided by the BTS.

The BTS may further control several transmission points, e.g. having Radio Units. A cell can thus comprise one or more BTSs each controlling one or more transmission/reception points. A transmission point, also referred to as a transmission/reception point, is an entity that transmits and/or receives radio signals. The entity has a position in space, e.g. an antenna. A BTS is an entity that controls one or more transmission points. The BTS may also be referred to as a Radio Base Station (RBS), depending on the technology and terminology used. The BTS may be of different classes such as e.g. macro cell, home cell or pico cell, based on transmission power and thereby also cell size.

Further, each BTS may support one or several communication technologies. The BTS communicates over an air interface operating on radio frequencies with the UEs within range of the BTS.

Typically a BTS will have several Transceivers (TRXs) which enables the BTS to serve UEs on several different frequencies and in different sectors of the cell. The BTS is controlled by a Base Station Controller (BSC). The BSC may control the BTS via a Base station Control Function (BCF). The BCF is implemented as a discrete unit or even incorporated in a TRX in compact BTSs. The BCF provides an Operations and Maintenance (O&M) connection to a Network Management System (NMS), which manages operational states of each TRX, as well as software handling and alarm collection.

In order for the BTS to function correctly, HardWare (HW) equipment of the BTS, such as the TRXs, has to be initialized properly in several software databases. These are an Installation DataBase (IDB) in the BTS and an BTS object model in the BSC. When the HW configuration in the BTS is changed, e.g. by adding or removing HW equipment, both databases have to be updated separately, using different tools and different interfaces. In the BSC each BTS is modeled as a set of TRX Managed Objects (MOs), and each TRX MO comprises further MOs, such as Transceivers (TXs), Receivers (RXs) and a plurality of TimeSlots (TSs). In order to be used for traffic, each MO needs to be taken into service and be deblocked. Since the installation of one single TRX requires issuing at least 6 BSC commands with various configuration parameters and a BTS may comprise up to 12 TRXs, this requires a large number of actions from an operator. Additionally a far more extensive configuration in the BTS has to be done, hence the initialization of a new HW configuration is a very time consuming job.

It is also of utmost importance that the configuration in the BSC matches the configuration in the IDB of the BTS, otherwise the HW equipment in the BTS will not work or will work improperly.

SUMMARY

It is therefore an object of embodiments herein to provide a more efficient way of configuring hardware being added or removed to/from a BTS.

According to a first aspect of embodiments herein, the object is achieved by a method in a BTS for configuring HW equipment being added or removed to/from the BTS. The BTS receives configuration data for the added or removed hardware equipment via a User Interface (UI). When the BTS has received the configuration data it initializes the HW configuration in an installation database ,(IDB), of the BTS, according to the received configuration data. The BTS further sends information about the added or removed HW equipment to a Base Station Controller (BSC).

According to a second aspect of embodiments herein, the object is achieved by a method in a Base Station Controller, (BSC), for configuring HW equipment being added or removed to/from the BTS. The BSC receives information about the added or removed HW equipment from the BTS. Based on the received information, the BSC creates an object model of the HW configuration.

According to a third aspect of embodiments herein, the object is achieved by a Base Transceiver Station (BTS) for configuring HW equipment being added or removed to/from the BTS. The BTS comprises means to receive configuration data for the added or removed hardware equipment from a user. The network node further comprises means to initialize the new hardware configuration according to the received configuration data in an installation database, (IDB), of the BTS. The BTS also comprises means to store the IDB. Furthermore, the BTS comprises means to send information about the added or removed HW equipment to a Base Station Controller (BSC).

According to a fourth aspect of embodiments herein, the object is achieved by a Base Station Controller, (BSC), for configuring HW equipment being added or removed to/from a BTS. The BSC comprises means to receive information for the added or removed HW equipment from the BTS. The BSC further comprises means to create an object model of the new HW configuration based on the received information.

By initializing the HW equipment in the IDB of the BTS via an UI and then sending information about the HW configuration from the BTS to the BSC the number of actions required by an operator for installing the new HW can be drastically reduced. This both reduces the installation time and the cost for equipment and operator.

A further advantage is that since the object model in the BSC is created based on the information received from the BTS, matching configurations between the IDB in the BTS and the BSC is assured. This also reduces the need for costly and time consuming troubleshooting of the hardware configurations in case of a non-working configuration.

BRIEF DESCRIPTION OF THE DRAWINGS

Examples of embodiments herein are described in more detail with reference to attached drawings in which.

DETAILED DESCRIPTION

Embodiments herein disclose a method in a Base Transceiver Station (BTS) for configuring hardware (HW) equipment being added or removed to/from the BTS, a method in a Base Station Controller (BSC) for configuring HW equipment being added or removed to/from the BTS, and a BTS and a BSC for performing the methods.

Figure 1:
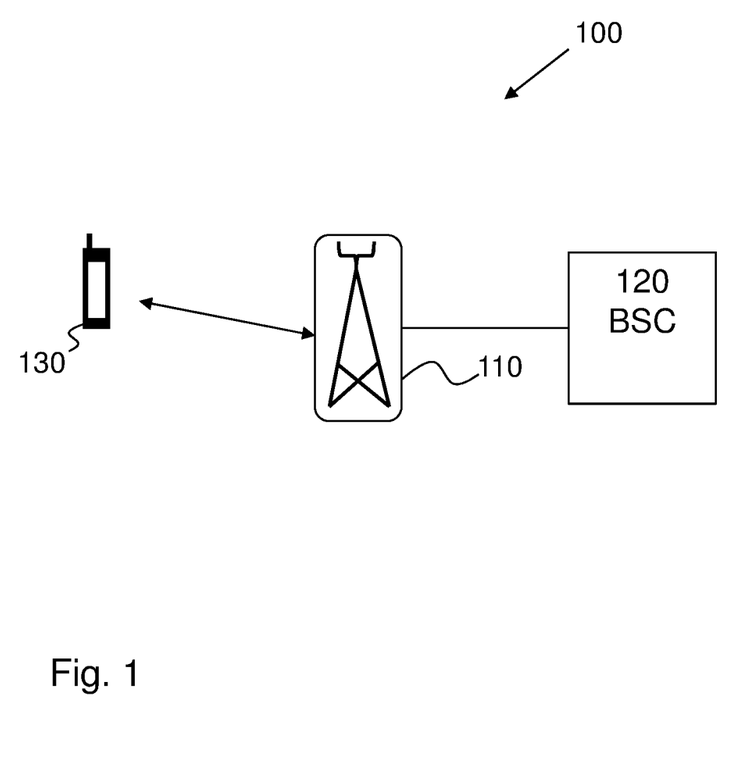
FIG. 1 is a schematic block diagram illustrating embodiments of a wireless communications network.

FIG. 1 depicts an example of a wireless communications network 100 according to an example scenario in which embodiments herein may be implemented. The wireless communications network 100 is a wireless communication network such as a GSM network.

The wireless communications network 100 comprises a plurality of Base Transceiver Stations (BTSs) 110, whereof one is depicted in FIG. 1. The BTS 110 comprises equipment for transmitting and receiving radio signals, also referred to as Transceivers (TRXs). The BTS 110 may further comprise antennas and equipment for encrypting and decrypting communications.

A User Equipment (UE) 130 is operating in the wireless network 100. The UE 130 may e.g. be a wireless device, a mobile wireless terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network.

The BTS 110 provides an access point to the network for the UE 130. The BTS 110 is responsible for transmitting and receiving radio signals between the UE 130 and the wireless communications network 100 when the BTS 110 is serving the UE 130.

The wireless communications network 100 further comprises a Base station Controller (BSC) 120 for controlling one or more BTSs 110. The BSC 120 handles allocation of radio channels, frequency administration, power and signal measurements from the UE 130, and, if several BTSs 110 are controlled by the same BSC 120, also handles handovers from one BTS 110 to another.

Embodiments of a method will first be described seen from a perspective of the BTS 110, and after embodiments of the method will be described seen from a perspective of the BSC 120.

Figure 2:
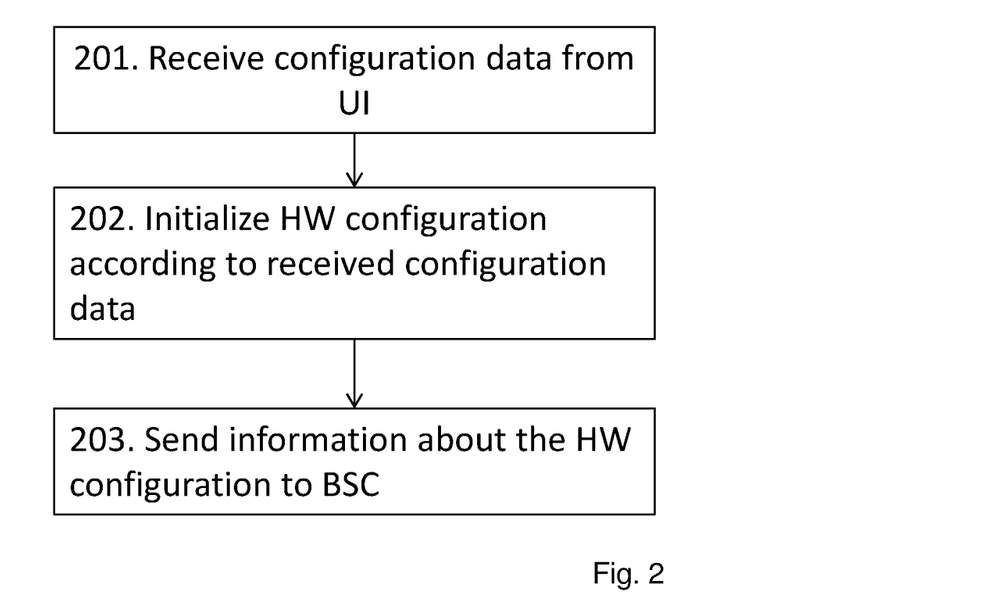
FIG. 2 is a flowchart depicting embodiments of a method in a BTS.

Example of embodiments of a method in the BTS 110 for configuring hardware, HW, equipment being added or removed to/from the BTS 110, will now be described with reference to a flowchart depicted in FIG. 2. The method comprises the following actions.

Action 201

The BTS 110 receives configuration data for the added or removed hardware equipment via a user interface (UI). The configuration data comprises information about what type of HW equipment has been installed in the BTS 110 and the intended use of the HW equipment. The information about the HW type may be used for monitoring the function of the HW. In one embodiment the HW equipment is a Transceiver, TRX. The HW equipment may however also comprise a Transmitter, TX, a Receiver, RX, or a processing unit for a Timeslot, TS.

The configuration data is sent to the BTS 110 by an operator via an user interface (UI). In a first embodiment the UI may be a Command-Line-Interface (CLI), a text-based web client or any other type of text based interface communicating with the BTS 110 via a Man-Machine-Language (MML).

In some embodiments the UI is a Graphical User Interface (GUI), which allows the operator to enter the configuration data through graphical icons and visual indicators instead of typing the commands via one of the text based interfaces. In one particular embodiment herein, the commands are communicated to the BTS 110 using a Machine to Machine (M2M) language.

Action 202

When the BTS 110 has received the configuration data it initializes a HW configuration according to the received configuration data. The HW configuration is initialized in an installation database (IDB) of the BTS 110. During the initialization the properties of the HW equipment, such as for example the type of HW equipment installed, the connections of each HW equipment and the intended functionality of each HW equipment, is set. In some embodiments, initializing the HW configuration may comprise storing the initialized properties of the HW equipment.

Action 203

After having initialized the HW configuration in the IDB, the BTS 110 sends information about the added and/or removed HW equipment to a Base Station Controller (BSC) 120. The sent information may be a subset of the configuration data received via the UI and may comprise the intended use of the HW equipment, such as for example supported bands, frequencies and power ranges.

In one embodiment herein, the information about the added and/or removed HW equipment may be sent to the BSC 120 via an Abis interface.

The information may be sent to the BSC 120 using a Machine to Machine (M2M) language.

Since the BTS 110 sends the information about the added and/or removed HW equipment to the BSC 120 it can be ascertained that correct and up-to-date information is distributed to the BSC 120 Another advantage is that troubleshooting a non-working HW configuration can be concentrated to the BTS 110, since the configuration in the BSC 120 follows the configuration in the BTS 110. Furthermore, the cost and the required time for configuring the new HW equipment is reduced since there is no need for an operator to go to the BSC 120 to issue the necessary commands using a second separate UI.

Embodiments of the method will now be described seen from a perspective of the BSC 120.

Figure 3:
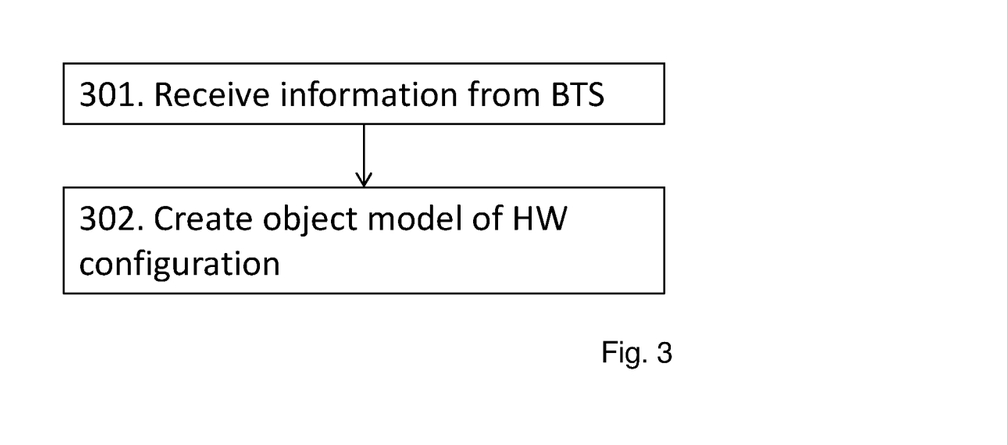
FIG. 3 is a flowchart depicting embodiments of a method in a BSC.

Thus, example of embodiments of the method in the BSC for configuring hardware, HW, equipment being added or removed to/from the BTS 110, will now be described with reference to a flowchart depicted in FIG. 3. As mentioned above, the BSC 120 is used for controlling the BTS 110.

The method comprises the following actions, which actions may be taken in any suitable order.

Action 301

The BSC 120 receives information about the added and/or removed HW equipment from the BTS 110. The information may be a subset of the configuration data received via the UI, and may comprise the intended use of the HW equipment.

The BSC 120 may receive the information about the added and/or removed HW equipment over an Abis interface.

Action 302

After receiving the information about the HW configuration, the BSC 120 creates an object model of the HW configuration in the BTS 110 based on the received information from the BTS 110. The BTS 110 is modeled in the BSC 120 as a set of TRX managed objects (MOs).

Each TRX MO may be modeled as further MOs, such as a Transceiver (TX), a Receiver (RX) and a plurality of Timeslots (TSs). During the creation of the object model of the HW configuration, each MO may be defined, taken into service and/or be deblocked.

Creating the object model of the HW configuration may not only include adding object models for added hardware, but may also include removing and/or adapting the object model to removed HW in the BTS 110.

By creating the object model of the HW configuration based on the received information from the BTS 110 it can be ascertained that the BTS object model maintained by the BSC 120 is always correct and up-to-date with the BTS 110 configuration. There is no need to additionally configure the BSC 120 using a separate UI at the location of the BSC 120. The method described eliminates risk for inconsistent, therefore faulty, configurations, and also reduces the time needed to bring the BTS 110 and BSC 120 into operation.

In some embodiments, creating the object model may comprise storing the object model of the HW configuration in the BSC 120.

Figure 4:
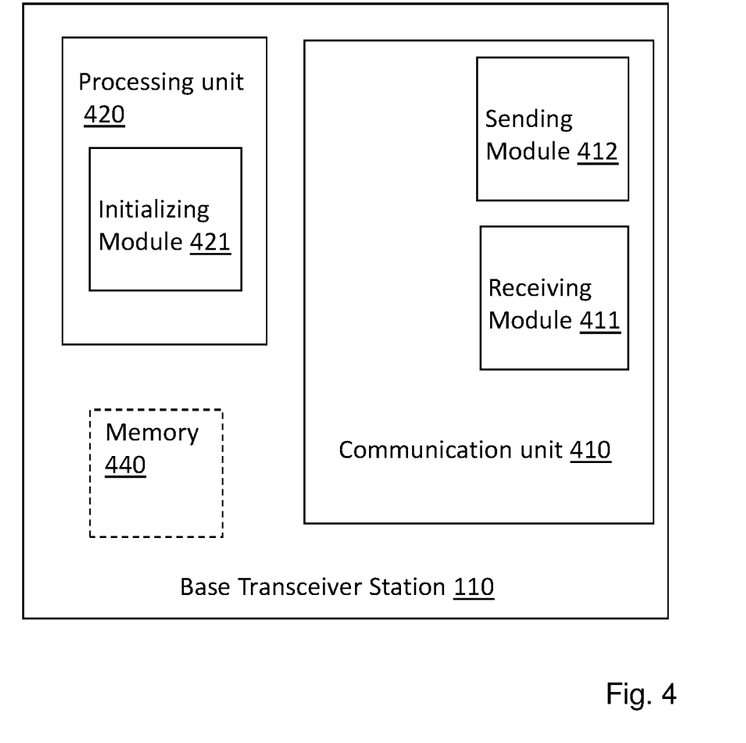
FIG. 4 is a schematic block diagram illustrating embodiments of a BTS.

To perform the method actions for configuring HW equipment being added or removed to/from the BTS 110, described above in relation to FIG. 2, the BTS 110 comprises the following arrangement depicted in FIG. 4.

The BTS 110 comprises a communication unit 410 for communicating with an UI or an BSC 120 and a processing unit 420.

The BTS 110 comprises means to, such as e.g. a receiving module 411 being configured to, receive configuration data for the added or removed hardware equipment from a user. The means for receiving may be a UI, such as a Command-Line-Interface (CLI), a text-based web client or any other type of text based interface communicating with the BTS 110 via a Man-Machine-Language (MML).

In a further embodiment, the UI may be a Graphical User Interface (GUI), which allows the operator to enter the configuration data through graphical icons and visual indicators instead of typing the commands via one of the text based interfaces. In one particular embodiment herein the configuration data may be arranged to be communicated to the BTS 110 over a Machine to Machine (M2M) interface.

The receiving module 411 may be comprised in the communication unit 410.

The BTS 110 further comprises means to, such as e.g. an initializing module 421 being configured to, initialize the new HW configuration according to the received configuration data in an installation database (IDB) of the BTS 110. The initializing module 421 may be comprised in the processor 420.

In one embodiment the HW equipment is a Transceiver, TRX. The HW equipment may however also comprise a Transmitter, TX, a Receiver, RX, or a processing unit for a Timeslot, TS.

The BTS 110 may further be configured to, e.g. by means of a storing module 441 being configured to, store the IDB of the BTS 110. The storing module may be comprised in a memory 440 in the BTS 110. The storing module may be arranged to be used to store obtained information, measurements, data, configurations, schedulings, and applications to perform the methods herein when being executed in the BTS 110. It should be noted that the dashed box of the memory 440 in FIG. 4 indicates that the memory is optional.

The BTS 110 is further configured to, e.g. by means of the sending module 412 being configured to, send information about the added or removed HW equipment to the Base Station Controller (BSC) 120. The sent information may be a subset of the configuration data received via the UI, and may comprise the intended use of the HW equipment. The sending module 412 may be comprised in the communication unit 410.

In a further embodiment the sending module 412 may be an Abis interface.

Figure 5:
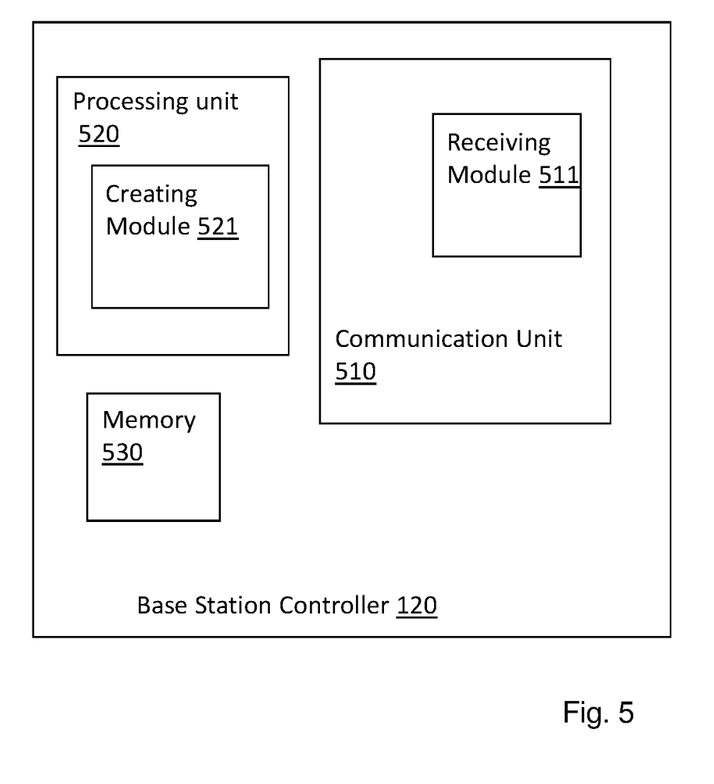
FIG. 5 is a schematic block diagram illustrating embodiments of a BSC.

To perform the method actions for configuring HW equipment being added or removed to/from a BTS 110, described above in relation to FIG. 3, the BSC 120 comprises the following arrangement depicted in FIG. 5. As mentioned above, the BSC 120 is used to control the BTS 110. The BSC 120 comprises a communication unit 510 for communicating with the BTS 110 and a processing unit 520.

The BSC 120 is configured to, e.g. by means of a receiving module 511 being configured to, receive information about the added or removed HW equipment from the BTS 110. In some embodiments the sent information may be a subset of the configuration data received via the UI, and may comprise the intended use of the HW equipment.

The receiving module 511 may be comprised in the communication unit 510.

In one embodiment the receiving module 511 may be an Abis interface.

The BSC 120 is further configured to, e.g. by means of an creating unit 521 create an object model of the new HW configuration based on the received information. The creating module 521 may be comprised in the processing unit 520.

The BSC 120 may further comprise a memory 530 comprising one or more memory units. The memory 530 is arranged to be used to store obtained information, object models, measurements, data, configurations, schedulings, and applications to perform the methods herein when being executed in the BSC 120.

The embodiments herein for configuring HW equipment being added or removed to/from a BTS 110 may be implemented through one or more processors, such as the processing unit 420 in the BTS 110 depicted in FIG. 4 or the processing unit 520 in the BSC 120 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the the BTS 110 or the BSC 120. One such carrier may be in the form of a CD ROM disc. It is however feasible with other data carriers such as a memory stick, a hard disk, a magnetic storage medium, a portable computer diskette or disc, flash memory, random access memory (RAM) or the like. Furthermore, the term "data carrier" may refer to an internal register memory of a processor or the like. The computer program code may furthermore be provided as pure program code on a server and downloaded to the BTS 110 or the BSC 120.

As used herein, the term "processing unit" may in some examples refer to a processing circuit, a processor, an Application Specific integrated Circuit (ASIC), a Field-Programmable Gate Array (FPGA) or the like. As an example, a processor, an ASIC, an FPGA or the like may comprise one or more processor kernels. In these examples, the processing unit is thus embodied by a hardware module. As used herein, the expression "configured to" may mean that a processing circuit is configured to, or adapted to, by means of software configuration and/or hardware configuration, perform one or more of the actions described herein.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of protection, which is defined by the appending claims.

The invention claimed is:

1. A method in a Base Transceiver Station (BTS) for configuring hardware (HW) equipment being added or removed to/from the BTS, the method comprising:
   the BTS receiving configuration data for the added or removed hardware equipment via a user interface (UI), wherein the HW equipment has a type and the configuration data comprises HW equipment type information indicating the HW equipment's type;
   the BTS initializing a HW configuration according to the received configuration data in an installation database (IDB) of the BTS; and
   the BTS sending to a Base Station Controller (BSC) that controls the BTS information about the added or removed HW equipment, said information sent by the BTS to the BSC comprising at least a subset of the configuration data received by the BTS, wherein
   the BTS is configured to serve a cell of a cellular communications network, and
   the BTS comprises a radio unit and is configured to utilize the radio unit to wirelessly communicate with user equipments (UEs) located in the cell.

2. The method according to claim 1, wherein
   the UI is one of: i) a Command Line Interface (CLI) and ii) a graphical user interface (GUI), and
   the receiving comprises one of: i) receiving the configuration data in a Man-Machine Language (MML) command and ii) receiving the configuration data in a Machine to Machine Language command.

3. The method according to claim 1, wherein
   the type information indicating the HW equipment's type comprises one of: i) first type information indicating that the HW equipment is a transmitter, ii) second type information indicating that the HW equipment is a receiver, and iii) third type information indicating that the HW equipment is a transceiver, and
   the information about the added or removed HW equipment that is transmitted by the BTS to the BSC comprises: i) power range information indicating a power range at which the hardware equipment is configured operate and ii) frequency information indicating a frequency at which the hardware equipment will receives and/or transmit data.

4. The method according to claim 1, wherein the sending comprises sending the information over an Abis interface.

5. The method according to claim 1, wherein the HW equipment is a transceiver.

6. A method in a Base Station Controller (BSC), the method comprising:
   the BSC controlling a Base Transceiver Station (BTS) that comprises a radio unit and that is configured to utilize the radio unit to wirelessly communicate with user equipments (UEs) located in a cell served by the BTS;
   the BSC receiving from the BTS hardware equipment information about hardware equipment added to the BTS, wherein the hardware equipment information was transmitted by the BTS to the BSC; and
   the BSC creating an object model of a HW configuration based on the hardware equipment information received from the BTS.

7. The method according to claim 6, wherein
   the method comprises storing the created object model in a memory, and
   the hardware equipment information received from the BTS indicates how the BTS will use the hardware equipment added to the BTS.

8. The method according to claim 6, wherein the receiving comprises receiving the information over an Abis interface.

9. A Base Transceiver Station (BTS) for configuring hardware (HW) equipment being added or removed to/from the BTS, the BTS comprising:
   a memory; and
   a processor coupled to the memory, wherein the processor is adapted to:
   receive configuration data for the added or removed HW equipment from a user, wherein the HW equipment has a type and the configuration data comprises HW equipment type information indicating the HW equipment's type;
   initialize the new hardware configuration according to the received configuration data in an installation database, IDB, of the BTS; and
   send information about the added or removed HW equipment to a Base Station Controller (BSC) that controls the BTS, said information sent by the BTS to the BSC comprising at least a subset of the configuration data received by the BTS, wherein
   the BST is further configured to serve a cell of a cellular communications network, and
   the BTS comprises a radio unit and is configured to utilize the radio unit to wirelessly communicate with user equipments (UEs) located in the cell.

10. The BTS according to claim 9, wherein the BTS is further configured to store the installation database of the BTS.

11. The BTS according to claim 9, wherein the BTS is configured to receive the configuration data via a user interface (UI).

12. The BTS according to claim 11, wherein the UI a Command Line Interface.

13. The BTS according to claim 11, wherein the UI is a GUI.

14. The BTS according to claim 13, wherein the configuration data may be arranged to be communicated to the BTS 110 over a Machine to Machine interface.

15. The BTS according to claim 9, wherein the BTS is configured to send the information via an Abis interface.

16. The BTS according to claim 9, wherein the hardware equipment is a transceiver.

17. A Base Station Controller (BSC), the BSC comprising:
- a memory; and
- a processor coupled to the memory, wherein the processor is adapted to:
    - control a Base Transceiver Station (BTS) that comprises a radio unit and that is configured to utilize the radio unit to wirelessly communicate with user equipments (UEs) located in a cell served by the BTS,
    - receive from the BTS hardware equipment information about hardware equipment added to the BTS, and
    - create an object model of the new HW configuration based on the hardware equipment information received from the BTS.

18. The BSC according to claim 17, wherein the BSC is further configured to store the created object model.

19. The BSC according to claim 17, wherein the BSC is configured to receive the information via an Abis interface.

20. The method of claim 1, further comprising:
- the BSC receiving the information about the added or removed HW equipment transmitted by the BTS; and
- the BSC creating an object model of a HW configuration based on the received information.

21. The method of claim 6, wherein the hardware equipment information transmitted by the BTS and received by the BSC comprises:
- power range information indicating a power range at which the hardware equipment is configured operate, and
- frequency information indicating a frequency at which the hardware equipment will receives and/or transmit data.

* * * * *